US010826757B2

(12) United States Patent
Dang et al.

(10) Patent No.: US 10,826,757 B2
(45) Date of Patent: *Nov. 3, 2020

(54) OPERATIONAL ANALYTICS IN MANAGED NETWORKS

(71) Applicant: ServiceNow, Inc., Santa Clara, CA (US)

(72) Inventors: Kanwaldeep Dang, Sammamish, WA (US); Purushottam Amradkar, Sammamish, WA (US); Stephen Scott Tucker, Kirkland, WA (US); Qingbin Li, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,079

(22) Filed: Jul. 16, 2019

(65) Prior Publication Data
US 2020/0014583 A1 Jan. 9, 2020

Related U.S. Application Data

(63) Continuation of application No. 15/587,066, filed on May 4, 2017, now Pat. No. 10,355,913.

(51) Int. Cl.
*G06F 15/173* (2006.01)
*H04L 12/24* (2006.01)
*H04L 12/26* (2006.01)

(52) U.S. Cl.
CPC ........ *H04L 41/065* (2013.01); *H04L 41/0686* (2013.01); *H04L 41/142* (2013.01);
(Continued)

(58) Field of Classification Search
USPC ................. 709/224, 223, 217, 219
See application file for complete search history.

(56) References Cited

U.S. PATENT DOCUMENTS 6,321,229 B1 11/2001 Goldman
6,609,122 B1 8/2003 Ensor
(Continued)

FOREIGN PATENT DOCUMENTS

WO 2010112855 A1 10/2010

OTHER PUBLICATIONS

Ahmad S. Kazmi; "Application of statistical sampling to predict faults from real time alarm data"; 2011 IEEE 14th International Multitopic Conference (INMIC); Dec. 22, 2011; pp. 290-295 (ISBN: 978-1-4577-0654-7).

*Primary Examiner* — Lan Dai T Truong
(74) *Attorney, Agent, or Firm* — Fletcher Yoder PC

(57) ABSTRACT

A computing system and method for remote monitoring and forecasting of performance of a managed network is disclosed. The computing system may be disposed within a remote network management platform and be configured for monitoring respective performance of each of a plurality of network entities of the managed network. For each network entity, an alert may be issued in response to determining that the monitored respective performance is below a respective threshold performance level. Based on analysis of a group of alerts, a likelihood may be determined that a different alert will be issued for the monitored performance of a particular network entity of the plurality for which no respective alert has yet been issued. In response to the likelihood exceeding a threshold, an alert prediction for the performance of the particular network entity may be issued together with a score corresponding to the likelihood.

20 Claims, 11 Drawing Sheets

(52) U.S. Cl.
CPC ............ *H04L 41/147* (2013.01); *H04L 41/22* (2013.01); *H04L 41/5009* (2013.01); *H04L 43/0817* (2013.01)

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Navarrete | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,137,115 B2 | 9/2015 | Mayfield | |
| 9,239,857 B2 | 1/2016 | Trinon | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,613,070 B2 | 4/2017 | Kumar | |
| 9,645,833 B2 | 5/2017 | Mueller | |
| 9,659,051 B2 | 5/2017 | Hutchins | |
| 9,792,387 B2 | 10/2017 | George | |
| 9,819,729 B2 | 11/2017 | Moon | |
| 9,852,165 B2 | 12/2017 | Morozov | |
| 10,002,203 B2 | 6/2018 | George | |
| 2006/0276995 A1 | 12/2006 | Breitgand et al. | |
| 2015/0244591 A1 | 8/2015 | Brown | |

OPERATIONAL ANALYTICS IN MANAGED NETWORKS

CROSS REFERENCE TO RELATED APPLICATIONS

This disclosure is a continuation of and claims priority to U.S. application Ser. No. 15/587,066, filed on May 4, 2017, which is herein incorporated by reference in their entireties.

BACKGROUND

As an enterprise employs more and remotely managed networks that include more and more devices and services, it becomes difficult to monitor performance in a manner that can keep pace with the speed at which and ways with which anomalies can escalate into problems. The enterprise might have tools with which to discover events after they happen. These tools, however, are insufficient for rapidly assessing how observed performance in one device or service may later impact performance of another device or service. As a consequence, a network manager of an enterprise network is often playing catch-up when faced with performance issues.

SUMMARY

It is now common for enterprise networks to include tens of thousands of devices across dozens of networks, supporting thousands of users. Enterprise networks may be deployed as remotely managed networks, in which many aspects of the actual underlying network architecture, as well as network operations, are managed offsite by a third party. One of the operational missions of remote network management is monitoring and managing performance of the devices and services deployed in the network. Advantageously, techniques and systems described here enable network performance management to look ahead, rather than just react.

In a managed network, operational performance of servers (and other computing devices) and services may be monitored by a management server. The managed network may include various servers, client devices, and other computing devices, as well as switches, routers, gateways, and the like, all interconnected in one or more enterprise networks, possibly including multiple subnets. Subnets may be deployed across multiple physical sites, which may be interconnected by a public internet or other backbone for example. The management server may be located remotely from the one or more sites making up a managed network, and may itself be implemented in a distributed fashion.

The services, computing devices, servers, and network infrastructure devices (switches, routers, gateways, etc.) may all be manageable. Generically referred to herein as "manageable network entities" (or just "network entities") each may include configurable hardware and/or software, as well as functionality to report operational and/or performance status and to receive and execute management-related commands, for example.

Various services running in the managed network may be distributed across multiple servers and/or other computing platforms or devices. As such, performance of these services may have dependencies on network interconnections and devices, such as routers and switches, which provide the interconnections. Performance may also depend on demand and processing load, among other factors. Functional dependencies between different services may also exist, further adding to service performance dependencies on network performance and network interconnections.

The complexity of interconnections and interdependencies presents challenges for managing network operational performance in a way that can not only monitor real-time performance metrics, but also provide information that can be predictive of future, possibly imminent, issues and/or problems. Advantageously, this challenge can be met by constructing one or more sets of performance analytics of both individual and groups of manageable network entities that are tracked or monitored by way of status alerts, which in turn are jointly analyzed to determine specific performance interdependencies between the services and servers of any given group. Analytical associations between services and servers can be used to derive conditional probabilities relating observed alerts to predicted alerts. Applying joint analysis to historical alerts may thus be used to provide predictions of future performance of various services and/or servers of a given group based on actual, real-time performance of other services and/or servers of the given group. In this way, operational performance of services and servers of a managed network may be forecast, enabling prediction of potential problems before they arise. Preventive and/or preemptive actions may be taken to avoid such potential problems.

Accordingly, a first example embodiment may involve a computing system disposed within a remote network management platform and configured to support a managed network, the computing system comprising: one or more processors; memory; and program instructions, stored in the memory, that upon execution by the one or more processors cause the computing system to perform operations including: monitoring respective performance of each network entity of a plurality of network entities of the managed network, each network entity being at least one of a service of the managed network or a computing device of the managed network, wherein each service of the managed network executes on at least one computing device of the managed network; for each of the plurality of network entities, issuing an alert in response to determining that the monitored respective performance is below a respective threshold performance level; based on analysis of a first group of one or more issued alerts, determining a statistical likelihood that a different alert will be issued for the monitored respective performance of a particular network entity of the plurality for which no respective alert has yet been issued; and issuing a score notification for the different alert in response to the determined statistical likelihood exceeding a score threshold, wherein the score notification includes the determined statistical likelihood and an identity of the particular network entity.

A second example embodiment may involve, a computer-implemented method carried out by a computing system disposed within a remote network management platform and configured to support a managed network, the method comprising: monitoring respective performance of each network entity of a plurality of network entities of the managed network, each network entity being at least one of a service of the managed network or a computing device of the managed network, wherein each service of the managed network executes on at least one computing device of the managed network; for each of the plurality of network entities, issuing an alert in response to determining that the monitored respective performance is below a respective threshold performance level; based on analysis of a first group of one or more issued alerts, determining a statistical likelihood that a different alert will be issued for the monitored respective performance of a particular network entity of the plurality for which no respective alert has yet been issued; and issuing a score notification for the different alert in response to the determined statistical likelihood exceeding a score threshold, wherein the score notification includes the determined statistical likelihood and an identity of the particular network entity.

A third example embodiment may involve, a non-transitory computer-readable medium having instructions stored thereon that, when executed by one or more processors of a computing system disposed within a remote network management platform and configured to support a managed network, cause the computing system to carry out operations including: monitoring respective performance of each network entity of a plurality of network entities of the managed network, each network entity being at least one of a service of the managed network or a computing device of the managed network, wherein each service of the managed network executes on at least one computing device of the managed network; for each of the plurality of network entities, issuing an alert in response to determining that the monitored respective performance is below a respective threshold performance level; based on analysis of a first group of one or more issued alerts, determining a statistical likelihood that a different alert will be issued for the monitored respective performance of a particular network entity of the plurality for which no respective alert has yet been issued; and issuing a score notification for the different alert in response to the determined statistical likelihood exceeding a score threshold, wherein the score notification includes the determined statistical likelihood and an identity of the particular network entity.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
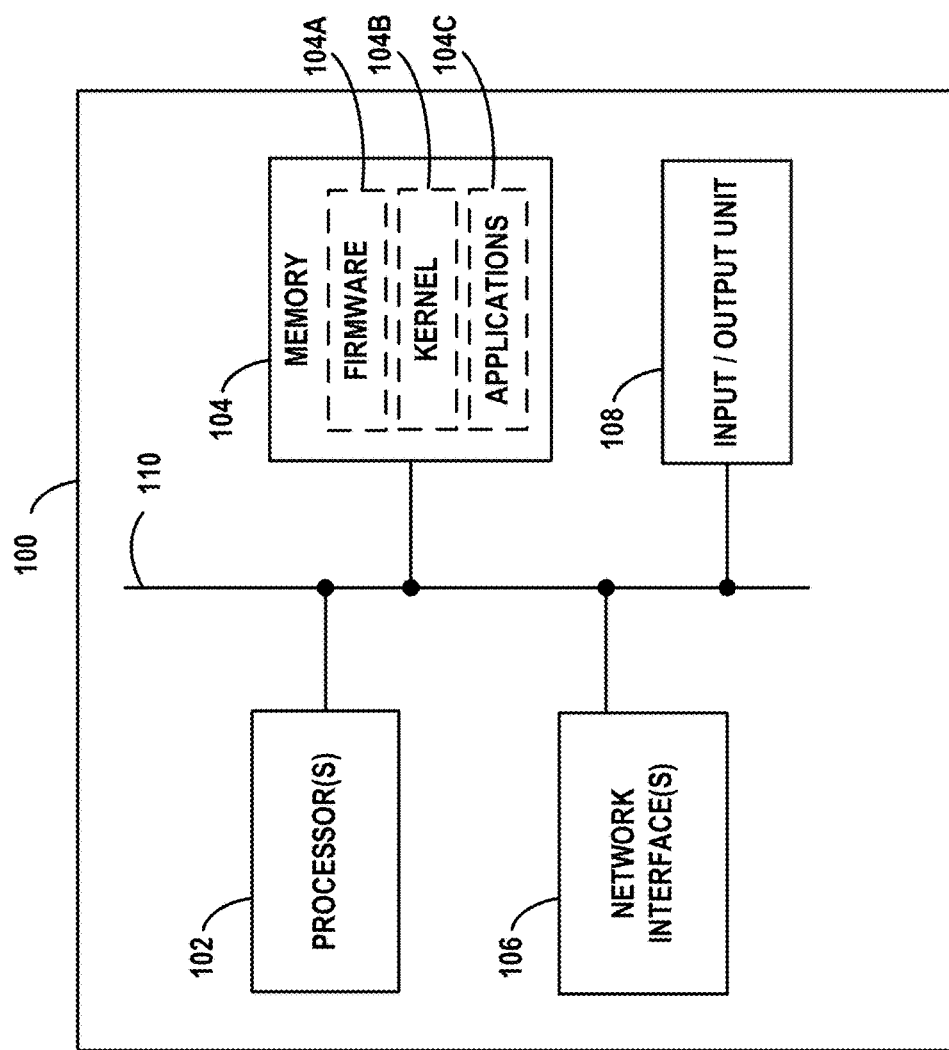
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor (s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
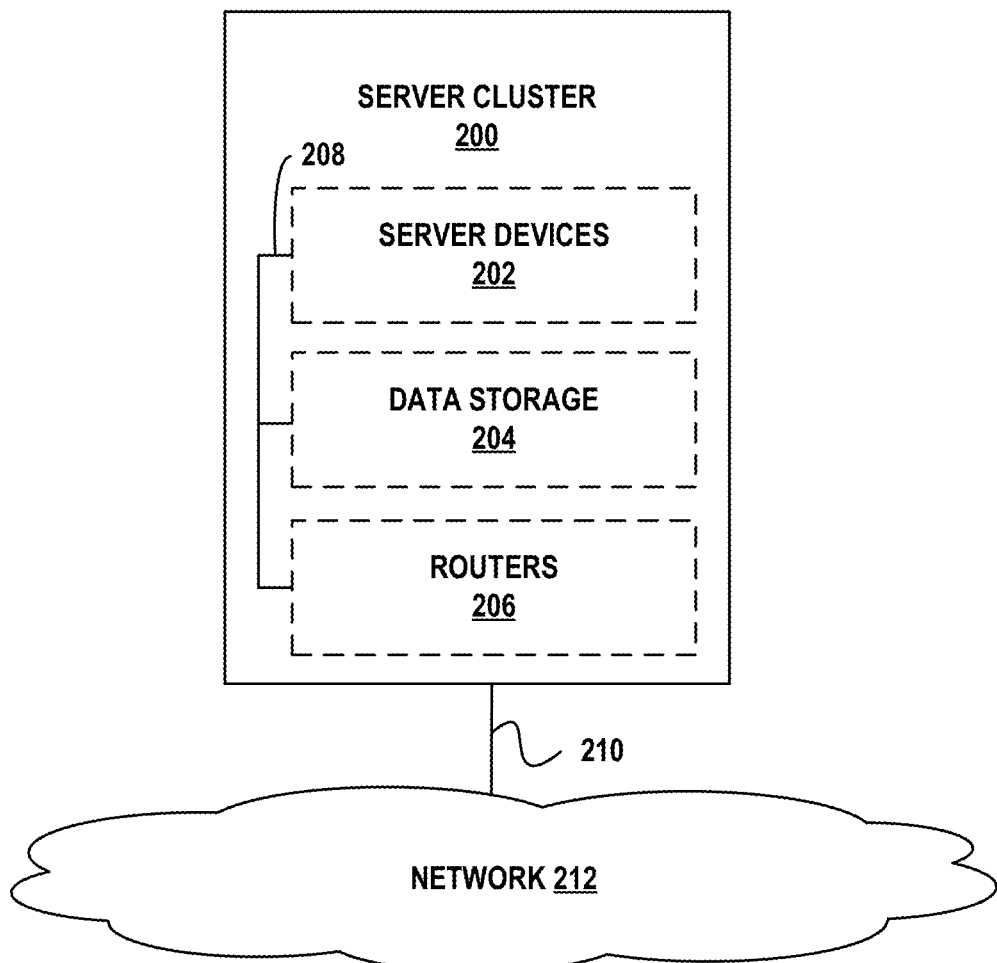
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
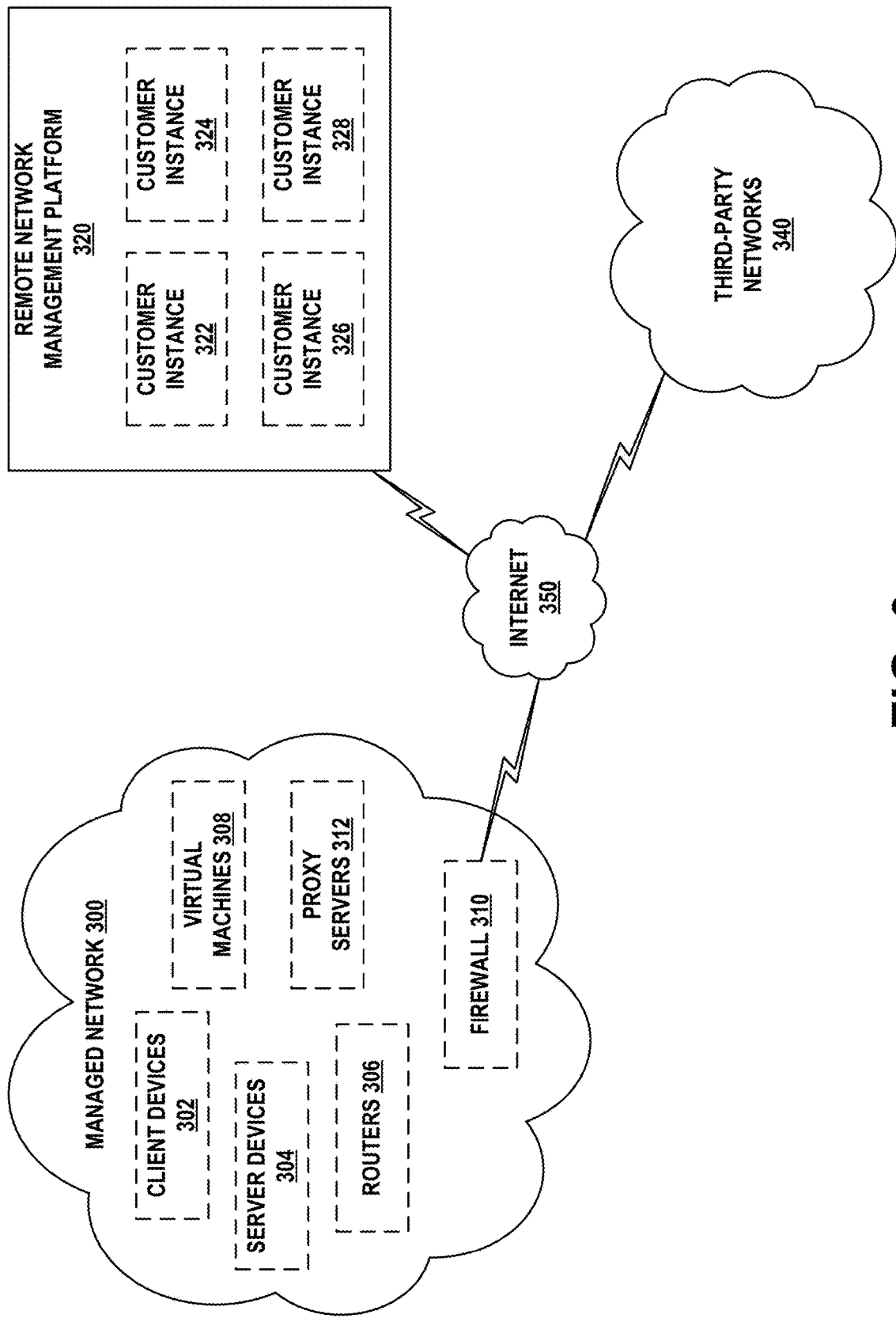
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database.

Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
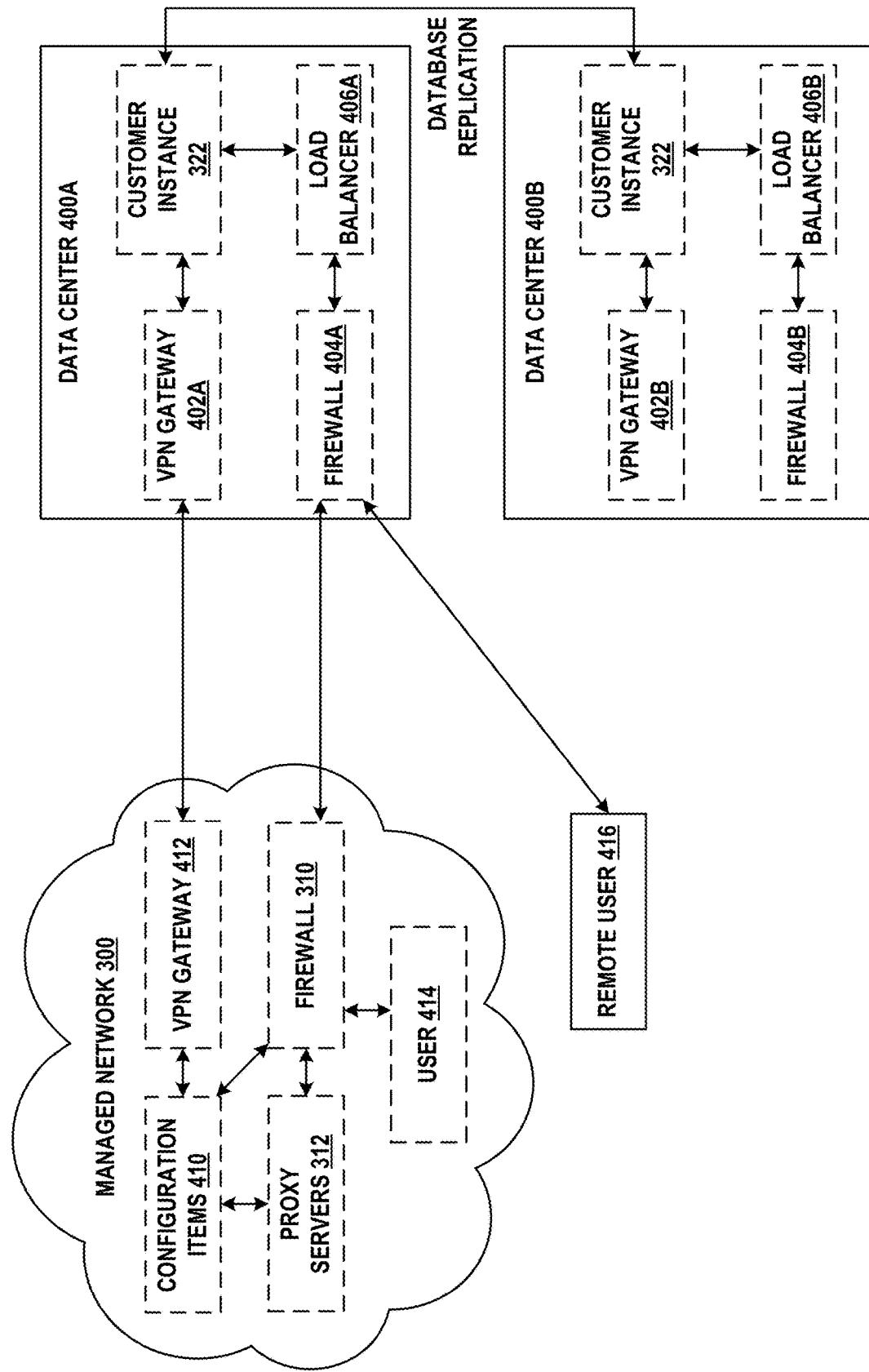
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE AND SERVICE DISCOVERY

In order for remote network management platform 320 to administer the devices and services of managed network 300, remote network management platform 320 may first determine what devices are present in managed network 300, the configurations and operational scorees of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
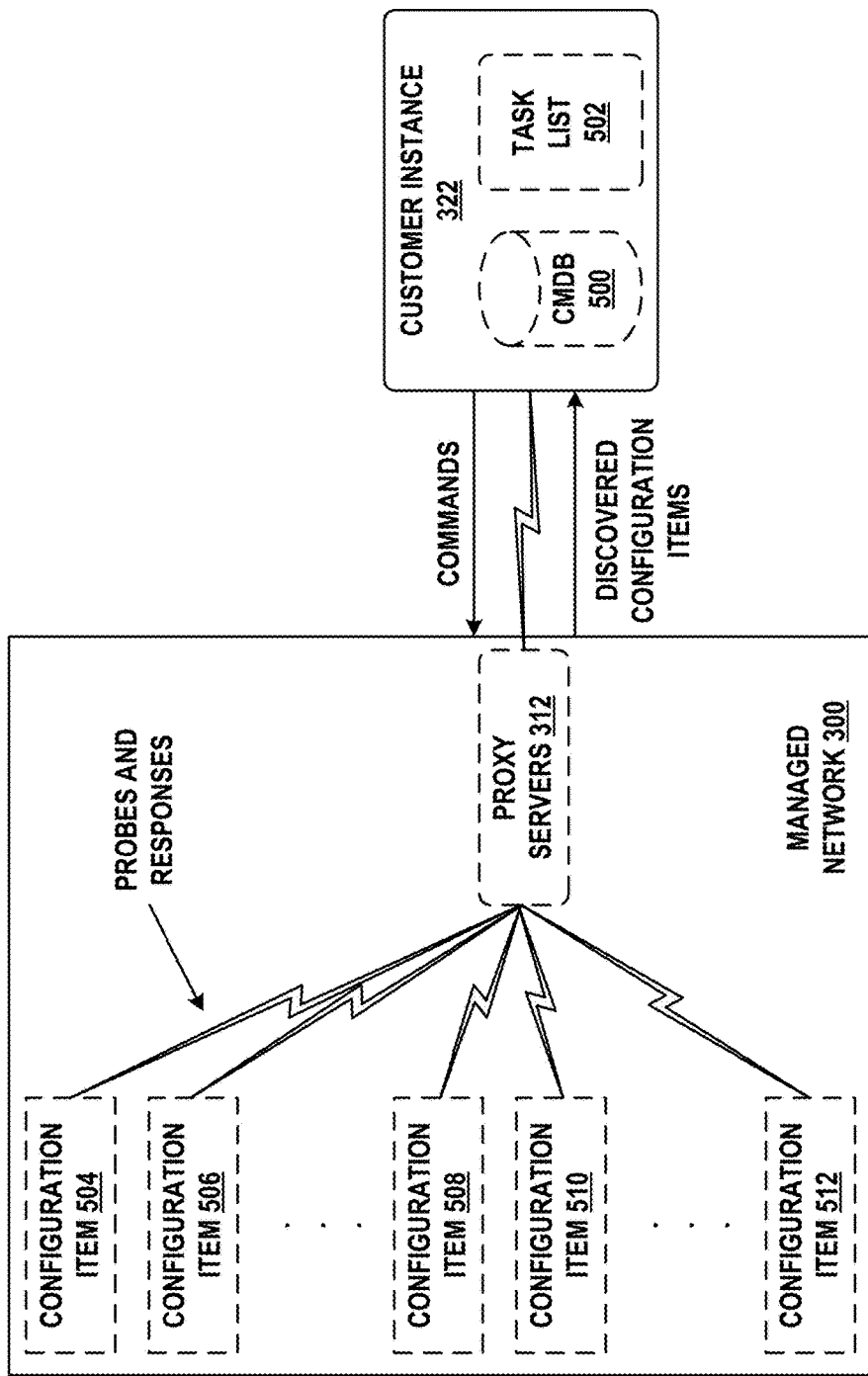
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational score of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
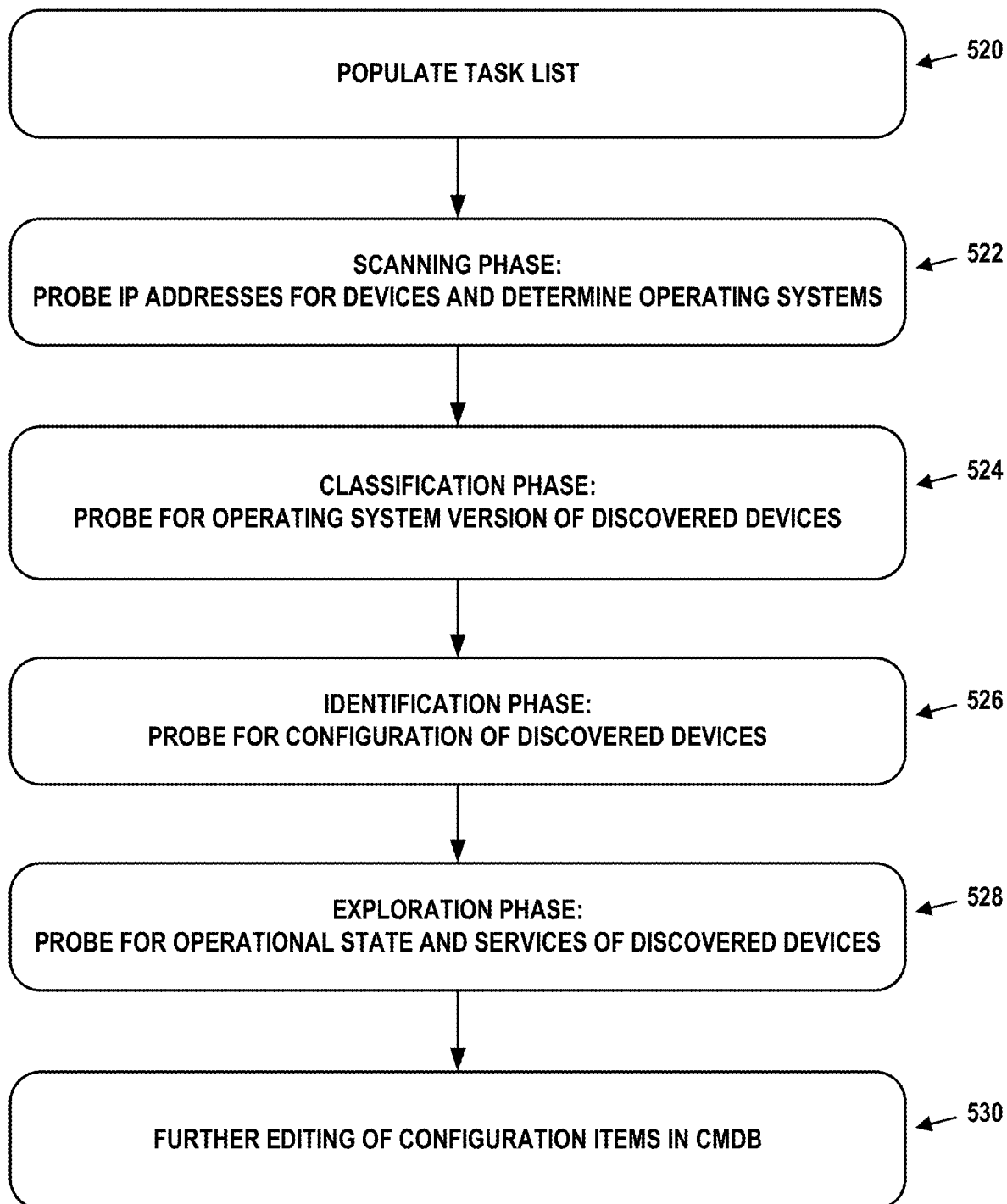
FIG. 5B is a flow chart of an example method, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE OPERATIONAL PERFORMANCE ANALYTICS

One of the operational missions of network management is monitoring and managing performance of the managed network, including its manageable devices and the applications and services that run on them, together referred to herein as manageable network entities. Functions and tasks that carry out this mission can be implemented and/or coordinated within a customer instance for a given managed network. In an example embodiment, performance monitoring and management may be configured as part of a remote network management platform 320.

There may also be components and/or elements of performance monitoring and management that deployed within the managed network. For example, routers, proxy servers, or other devices could run programs or services that communicate with manageable network entities in the managed network in order to collect and report performance metrics. The programs or services could also carry out some evaluation and/or analysis of collected performance metrics. For example, performance metrics could be compared with defined thresholds or target performance levels, and alerts or other event notifications could be generated in response to detecting observed performance levels below one or another threshold and/or beyond or outside of one or another defined operating range. In an example embodiment, SNMP could be used to collect performance metrics from manageable network entities. Other management protocols could be used instead or as well.

In accordance with example embodiments, performance monitoring and management of a managed network may advantageously integrate performance forecasting and prediction with real-time, near-real-time, and historical performance monitoring and analysis. This integration of past, current, and predicted performance of a managed network and its constituent manageable entities is referred to herein as "operational performance analysis," and may be implemented on one or more computing systems and/or platforms within a remote management platform. By providing performance forecasting and prediction, operational performance analytics can anticipate potential problems with performance and/or operation of manageable network entities before they occur, providing an opportunity to take preemptive actions.

In accordance with example embodiments, operational performance analysis may be implemented in computing system that is part of a remote network management platform 320. The computing system may include one or more processors, memory, and program instructions that, when executed by the one or more processors, cause the computing system to carry out various operations and functions of operational performance analysis described herein.

Figure 6:
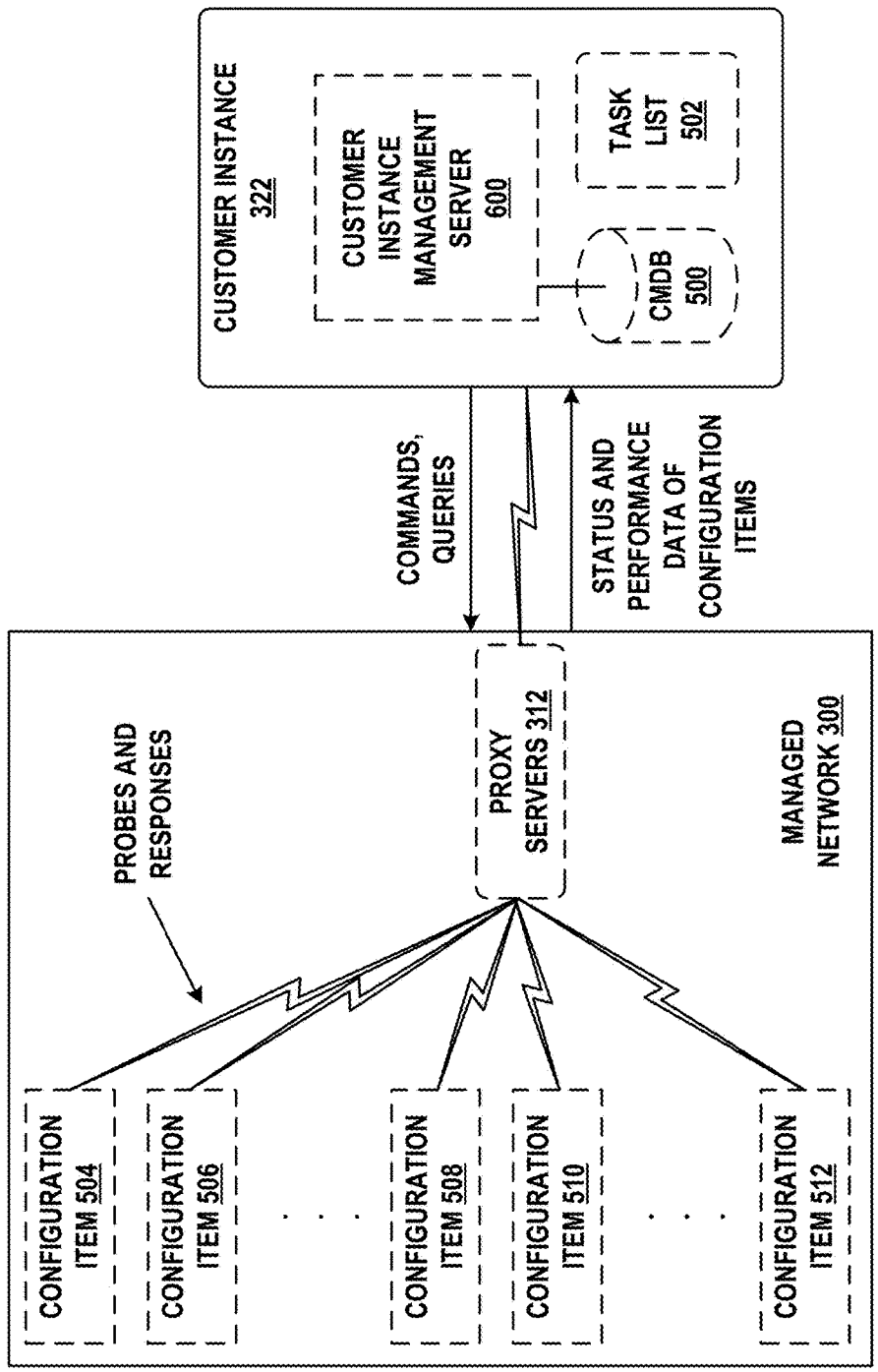
FIG. 6 depicts another communication environment involving a remote network management architecture, showing additional detail, in accordance with example embodiments.

In an example embodiment, the computing system that implements operational performance analysis may be part of a remote management server. This is illustrated in FIG. 6, in which a remote management server takes the form of a customer instance management server 600 within, or as part of, the customer instance 322. As in FIG. 5A, the customer instance 322 also includes the CMDB 500 and task list 502. The customer instance management server 600 can access and/or consult the CMDB 500, enabling it to gain information about the configuration items 504-512 of the managed network 300 that is managed by the customer instance 322. The customer instance management server 600 can use this information to query or command one or more of the configuration items for status and performance information by way of the proxy servers 312, as indicated. Status and performance data may be returned in reply, as also indicated. As noted above, protocols such as SNMP could be used to make such queries and to collect performance statistics about the configuration items 504-512. Based on monitored performance data, the customer instance management server 600 could carry out various operations and function of operational performance analysis.

In example operation, the customer instance management server 600 could communicate with a proxy server 312, a router 306, or other intermediary device in the managed network 300 to invoke actions for requesting and/or demanding performance data from one or more manageable devices, such as operational metrics indicative of one or more levels of performance of the manageable devices. For example, manageable devices could report processor (e.g. CPU) load, memory usage, program capacity loading and/or utilization, faults, events, and retransmission statistics, among other non-limiting examples of performance statistics. Performance data could be reported directly back to the customer instance management server 600 in "raw" (e.g., unprocessed or unanalyzed) form. Raw data may then be analyzed, for example to determine what thresholds may have been exceeded or what target performance levels may have failed to have been achieved. Additionally or alternatively performance data could be reported directly back to the customer instance management server 600 with some degree of analysis or processing, such as indications about thresholds and (under)achievement of target performance levels.

Figure 7:
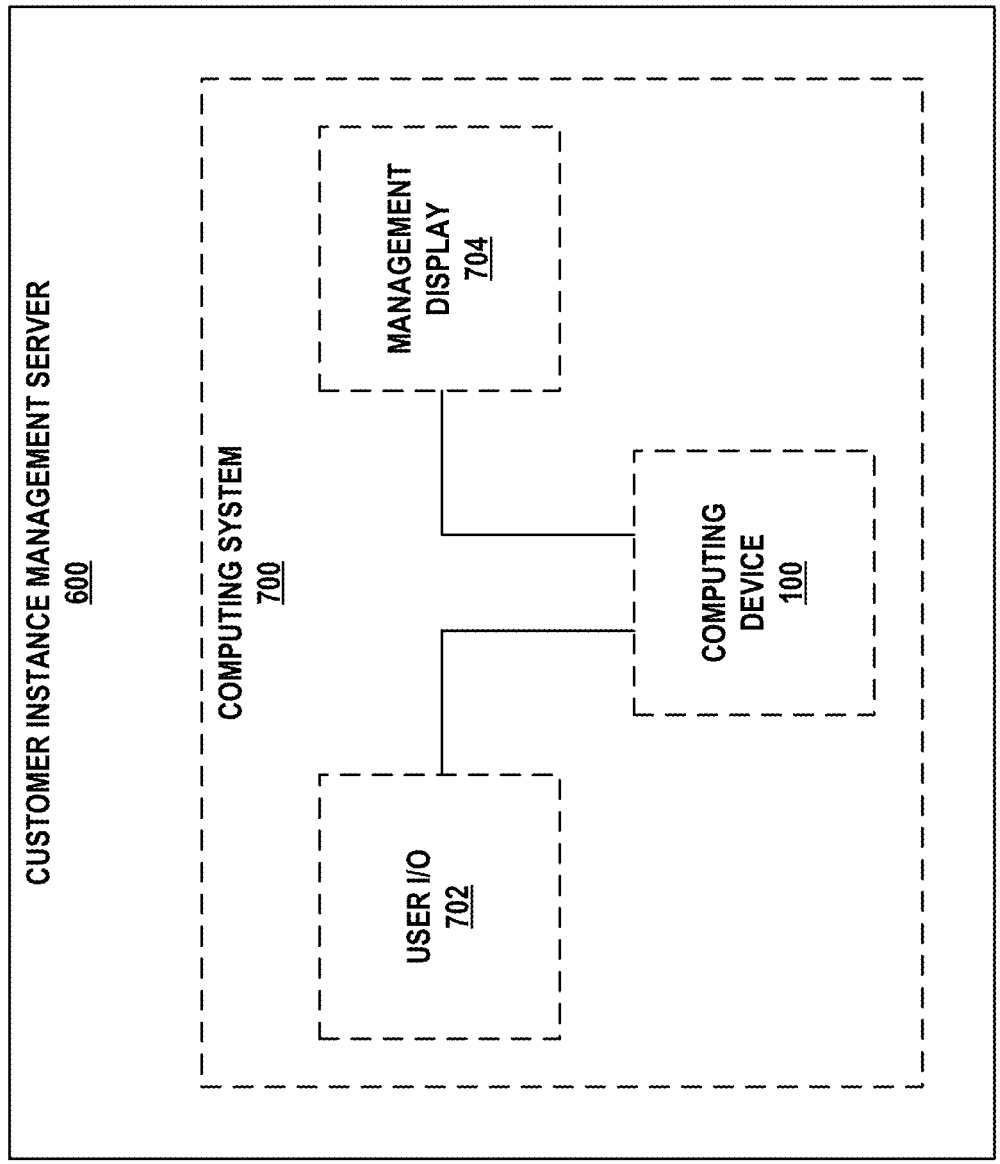
FIG. 7 depicts a remote management server, in accordance with example embodiments.

FIG. 7 illustrates an example customer instance management server 600, in accordance with example embodiments. The arrangement shown could also apply more generally to other implementations of a remote management server. As shown, the customer instance management server 600 includes a computing system 700 that, in turn, includes a computing device 100, a user I/O interface 702, and a management display 704. The user I/O interface 702 may include a keyboard and mouse, as well as other devices enabling a user interact with the computing system 100. The management display 704 includes a display device for displaying performance and monitoring data, such as metrics, and other performance indicators, described below in more detail. While the management display 704 may be considered an output device, it is shown separately from the user I/O 702 to facilitated discussion of specific features and functions of operational performance analysis, also discussed below.

In accordance with example embodiments, processing and/or analysis of performance metrics, and comparisons with various thresholds, target levels, and ranges, could be used to generate alerts. More particularly, alerts can be used to signal that operational performance of one or more manageable entities has fallen below some threshold level, failed to achieve at least some target level, or failed to maintain some operational range. Other types of performance criteria could be applied to indicate conditions signaled by alerts. In addition, alerts for a given manageable network entity could also indicate a severity level, depending on a degree or amount by which observed (monitored) performance deviates, diverges, or departs from a threshold, target level, or operating range, for example.

Alerts can be used in operational performance analysis to uncover and monitor performance dependencies between two or more manageable network entities, providing a basis for predicting or forecasting future alerts for performance of a particular network entity based on observed alerts for performance of other network entities. In accordance with example embodiments, alerts for performance of two or more network entities may be grouped together based on either known or empirically-derived causal associations between them. Known causal associations may be established based, for example, on known functional dependencies between various network entities whose respective performances are tracked by a set of alerts. The alerts of the set may thus be grouped based on the known dependencies. The knowledge of the functional dependencies could be based known network configurations of the network entities and/or known operational flow between network entities, for example. In an example embodiment, this information could be recorded in the CMDB 500. Empirically-derived causal associations may be established based on observations of alerts over time. For example, it may be observed by operations management personnel that certain alerts tend to occur in a fixed or nearly-fixed sequence. This observation may then suggest grouping these certain alerts together. As described below, grouping of alerts can be an automated or semi-automated process, an interactive process involving user selections, or some combination thereof.

Figure 8A:
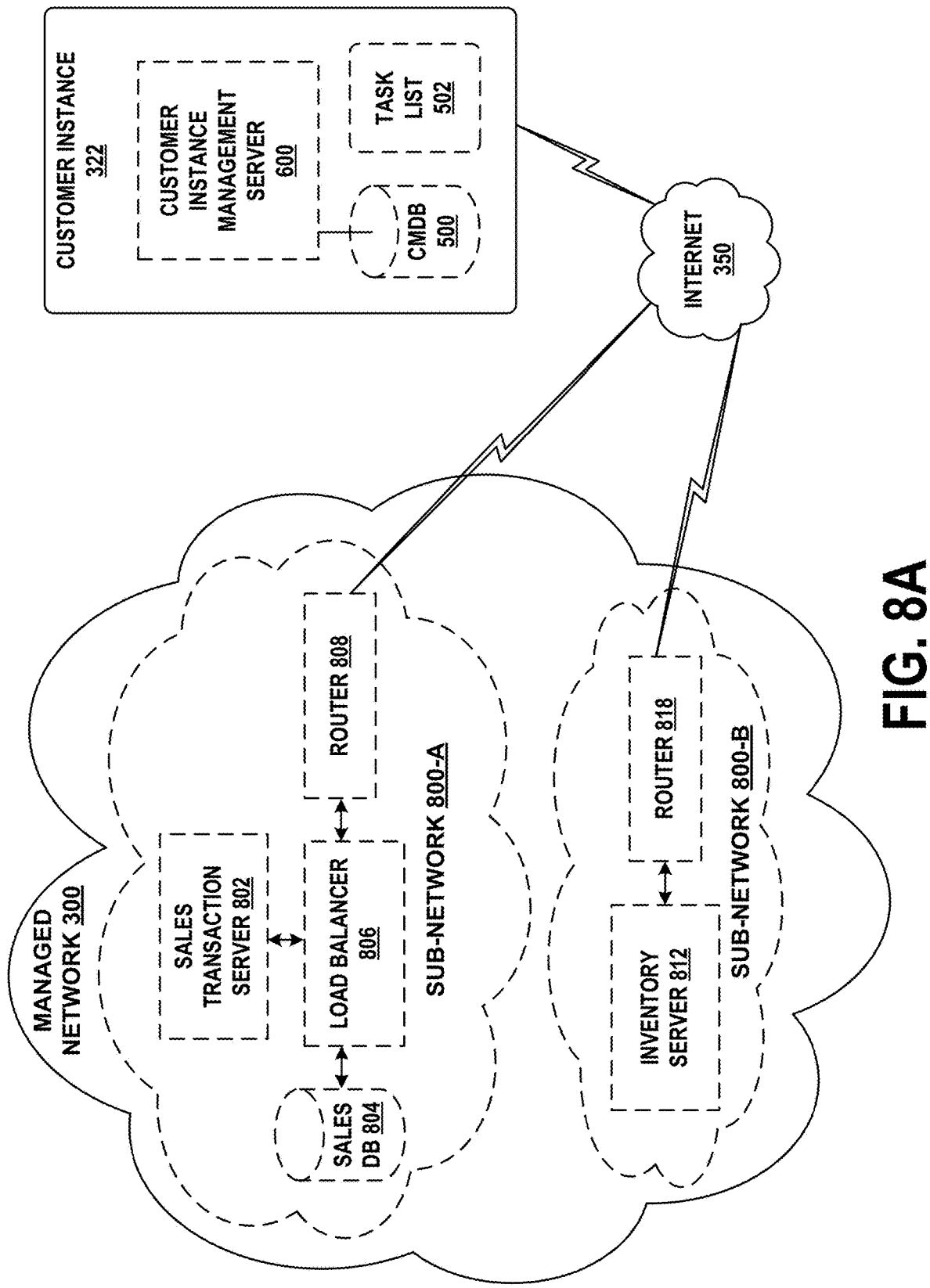
FIG. 8A depicts further aspects of a remote network management architecture, in accordance with example embodiments.

FIG. 8A depicts further aspects of a remote network management architecture of a managed network 300 that illustrate some examples of how and where interdependencies can manifest. In this example, the managed network 300 is shown to include two sub-networks 800-A and 800-B. For the sake of brevity in the figure, only one customer instance 322 is depicted and third-party networks 340 is omitted. The sub-networks 800-A and 800-B each include illustrative manageable network entities having illustrative interconnections indicated by bi-directional arrows. Thus, for example, sub-network 800-A includes a sales transaction server 802 connected with a load balancer 806, which in turn is connected with a sales database 804 and a router 808. Also by way of example, the sub-network 800-B includes an inventory server 812 connected with a router 818. The routers then provide connectivity to the customer instance 322 by way of the internet 350. It will be appreciated that the manageable network entities and interconnections shown in FIG. 7 are representative, and that there could be others as well.

In an example scenario, operations involving the sales transaction server 802 and the sales database 804 may have performance interdependencies on each other, and both have dependencies on the load balancer 806. All three may have dependencies on the router 808. Similarly, the inventory server 812 may have dependencies on the router 818. There could be interdependencies across sub-networks as well. For example, there could be operations or functions of the sales transaction server 802 on the inventor server 812. These are just some illustrative examples.

In accordance with example embodiments, the various dependencies and interdependencies may be captured or discoverable from information in the CMBD 500, or possibly through the process described above for how the CMDB 500 is created. As such, the CMBD 500 (or other database of manageable network entities and of discovered network architecture) can provide information for recognizing and/or learning which manageable network entities may have alerts that are, or are likely to be, associated. Associated alerts may thus be grouped, and their occurrence statistics analyzed to derive performance prediction and forecasting probabilities.

More particularly, alerts in a group can be treated as statistical performance data, which may then be analyzed to quantitatively determine conditional probabilities connecting their respective occurrences. The conditional probabilities then form the basis for predicting future occurrences of one or more alerts of the group based on observed occurrences of other alerts of the group. As described above, each alert in a group may represent an occurrence of a particular manageable network entity having performance below a threshold or target level. Thus, given an occurrence of an alert for one manageable network entity, the likelihood that an alert will occur for a different manageable network entity in the group can be determined according to a conditional probability connecting the alerts.

In accordance with example embodiments, conditional probabilities connecting pairs of alerts of a group, where each alert of the pair is associated with a some type of sub-target performance for a different manageable network entity, can be determined by computing a joint probability distribution for the alerts in the group. Various analytical techniques for estimating a joint probability may be cast in terms of the conditional probabilities. Thus, the conditional probabilities may be derived from the estimated (computed) joint probability distribution.

In an example embodiment, the joint probability of the alerts in a group may be estimated as a Chow-Liu tree and using known analytical and algorithmic techniques. In general, this approach may be applied to a data set of N variables $\{x_1, x_2, \ldots, x_N\}$ represented as an N-dimensional vector $x=(x_1, x_2, \ldots, x_N)$ and having joint probability distribution $P(x)$. In a tree model, each variable defines a node or vertex in a tree, and pairs of nodes are connected by edges or branches that correspond to a statistical weight of the connection. Each node may have one parent but more than one child. The joint probability may be approximated as $P_t(x)=\Pi_{i=1}^{N}P(x_i|x_{\pi(i)})$, where $x_{\pi(i)}$ corresponds the parent of $x_i$ (which is the empty set for the root node of the tree). The approximated joint distribution is then estimated by minimizing the Kullback-Leibler divergence (or KL divergence) between the estimated distribution $P_t(x)$ and assumed actual joint distribution $P(x)$, where the KL divergence is given by $$KL(P, P_t) = \sum_{i=1}^{N} P(x)\log\frac{P(x)}{P_t(x)}.$$

In a Chow-Liu tree, the edges or branches connecting the nodes correspond to the mutual information between the variables of the connected nodes, and is given by $$I(x_i, x_j) = \sum_{x_i, x_j} P(x_i, x_j)\log\left(\frac{P(x_i, x_j)}{P(x_i)P(x_j)}\right).$$

The joint distribution may then be determined using a well-known efficient computational technique referred to as the Chow-Liu algorithm.

In applying the Chow-Liu algorithm to operational performance analysis, the alerts within a group are taken to be the data set $\{x_1, x_2, \ldots, x_N\}$, so that each node in the tree represents an occurrence of an alert for some type of sub-target performance for one of the manageable network entities associated with the alerts in the group. As such, the statistical weights represented by the branches correspond to the mutual information between pairs of alerts associated with different manageable network entities of the group. The derived conditional probabilities are therefore indicative of the likelihood that an occurrence of one alert associated with one network entity will be followed by an occurrence of an alert associated with different network entity. Advantageously, the conditional probabilities therefore provide for prediction and/or forecasting of performance alerts based on observed alerts.

In accordance with example embodiments, a group of alerts may be created or generated by selecting alerts dynamically in real-time, in near-real-time, from historical data, or some combination of these selection procedures. Analysis of a joint probability of alerts in a group can similarly be carried out on real-time data, near-real-time data, historical data, or some combination of temporal time scales of the alert data of a group. Alerts may be selected for inclusion in a group based at least in part on known or suspected causal associations. In real-time or near-real time selection, alerts may be observed by a user during the course of active performance monitoring, and then selected in an interactive procedure by a user. For example, it may be observed over some period of time that a particular alert is frequently issued after one or more other particular alerts are issued. Such an observation may then provide a basis for grouping the alerts that have appeared together in previous instances. Once grouped, an analysis as described above may be carried out to quantify the probabilistic relationship among the alerts in the group.

Analysis of historical data can also uncover causal associations and provide criteria for inclusion in a group. Again, analysis can then quantify the probabilistic relationship among the alerts in such a history-based group. Again, a user may create a group through an interactive process applied to the historical data. Additionally or alternative, an automated or semi-automated process could be applied to the historical data that uncovers likely causal associations and uses the results to generate a group. Other automated, or semi-automated, or interactive processes could also take account of known network architecture, operational interdependencies, and/or data/information flows to identify likely causal associations and uses the results to generate groups.

Figure 8B:
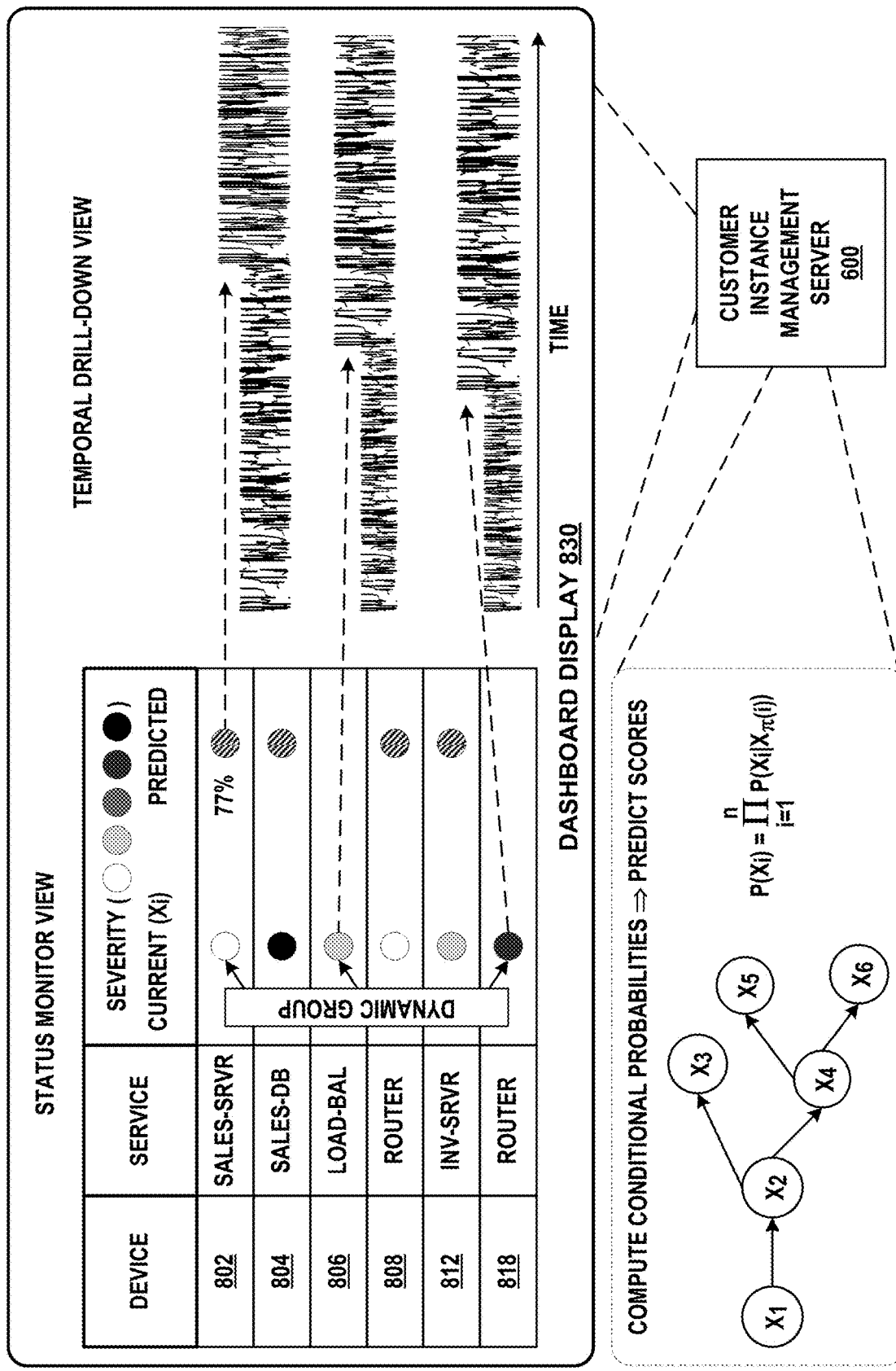
FIG. 8B illustrates an example display presentation of a remote management server, as well as a conceptual representation of an aspect of performance monitoring, in accordance with example embodiments.

A representation of active alert monitoring in accordance with example embodiments is shown in FIG. 8B, which illustrates an example display presentation of a remote management server, as well as a conceptual representation analysis of alerts. The figure shows a customer instance management server 600 and an example dashboard display 830 showing a snapshot of active alert monitoring. The left side of the display depicts a status monitor view of alerts for the network entities shown in FIG. 8A, namely, a sales transaction server 802, sales database 804, load balancer 806, router 808, inventory server 812, and router 818. These are listed by host device item number (808, 804, . . . , 818) in a first column labeled "Device," and by service in a second column labeled "Service." A third column displays an alert status (corresponding to the $x_i$ data, as indicated) for each device/service as a shaded circle, where the shading represents a severity level of an issued alert. By way of example, white represents the lowest severity (or possibly corresponding to "no alert"), and black represents the highest severity level; shades of gray in between correspond to a severity level gradation. To the right of each issued alert, a hatched circle represents a predicted alert. It will be appreciated that the dashboard display 830 in FIG. 8B is just an example illustration of what such a display could look like and what information is presented. Other formats and presentations are possible as well.

In the example snapshot of FIG. 8B, alerts for the sales transaction server 802, the load balancer 806, and the router 818 are shown to be part of a dynamic group. Evidently and by way of example, at the time of the snapshot, alerts of differing severity levels have been issued for the load balancer 806 and the router 818. No alert has been issued for the sales transaction server 802, but evidently one has been predicted based on the analysis of all three alerts. The predicted alert is also listed with an example "score" of 77%, which corresponds to a confidence level of the prediction. Note that an alert for the sales transaction server 802 can be included in the group even though no actual alert has yet been issued. As described above, this selection may be based on previously observed behavior, known interdependencies of the alerts, or some combination thereof.

The right side of the dashboard display 830 shows an example of a temporal "drill-down" view, in which time series data of the actual performance underlying the alert status is shown. Evidently and by way of example, the router 818 and load balancer 806 both show upward jumps in the monitored performance. In the context of the currently illustrative example, these jumps could represent a jump in capacity utilization or like that results in performance degradation and the issuing of the alerts that are shown for each device/service. A similar jump and corresponding performance degradation is then predicted for the sales transaction server 802, as also shown in the drill-down view. Using this information, a user such as an operations engineer, could receive advanced notice or warning of a potential problem, and take possible action avoid or alleviate the problem before it occurs. This snapshot view illustrates just one aspect of how operational performance analytics can be applied to alerts to predict and/or forecast problems before they occur.

The lower left side of FIG. 8B shows a conceptual depiction of the analysis of alerts carried out by the customer instance management server 600. Following from the discussion above of analysis using a Chow-Liu tree, the conceptual illustration shows an representative tree in which the nodes are the alert (e.g., $\{x_1, x_2, \ldots, x_6\}$ and the joint probability distribution is computed according the conditional probabilities. In accordance with example embodiments, each prediction of a future alert derived from the conditional probabilities can be reported as a score that gives a statistical confidence level of the prediction of a future alert. This is illustrated by way of example in the figure, as indicated by the "77%" next to the predicted alert.

In accordance with example embodiments, selection of alerts for inclusion in a group can be an interactive process or an automated or semi-automated process. Either approach could evaluate active alerts and/or historical alerts to uncover empirical evidence of causal relations between alerts. In an example embodiment, there may be more than one interactive monitoring server or station, each possibly with a different view of alerts. This embodiment may further support sharing group selections among different users at the different monitoring stations. For example, a user at one station may share a group selection with a user at a different station. In this way, different users can make each other aware of alerts that they are seeing, and thereby quickly and efficiently propagate forecasts or predictions of impending issues or problems.

Also in accordance with example embodiments, various performance thresholds, target performance levels, and target performance ranges may be set and adjusted interactively by one or more users. For example, the severity levels illustrated in FIG. 8B could correspond to gradations of thresholds for issuing alerts. By way of example, the white circle could correspond to a capacity utilization of less than 10%, while the black circle could correspond to a capacity utilization of 90%, and the gradations in between could correspond to capacity utilizations of 30%, 50%, and 70%. An alert of a given gradation could then be issued for observed/monitored capacity utilization greater than the corresponding threshold for the given gradation. Other values could be used, and they could be adjusted dynamically by a user. There could be other thresholds as well. For example, there could be a temporal threshold to define how long a given condition should or must persist before an appropriate alert is issued.

In further accordance with example embodiments, a threshold score could be used to determine if and when an alert prediction should be issued. For example, a score threshold of 40% for a particular network entity could correspond to a requirement that only alert predictions with scores of at least 40% should be issued for performance of the particular network entity. Again, score thresholds could be set interactively by users, and values other than 40% could be used.

In a similar manner, target performance levels and ranges could also be set interactively. Further, performance thresholds and target performance levels could be used as lower bounds, such that a observed or monitored performance would need to fall below a threshold or target level in order to trigger an alert. Target ranges could be similarly used to define acceptable operation either within a range or instead outside of a range.

In accordance with example embodiments, alerts may be generated by various network devices and/or services, as well as at different times relative to the performance that is being monitored. For example, a manageable network entity could incorporate a performance monitoring function or application capable of self-monitoring one or more performance metrics, and generating one or more alerts according to one or more thresholds, targets, or ranges. A remote management server, such as the customer instance management server 600, could send commands to the network entity to set up the self-monitoring, and later receive monitoring data, including alerts, from the network entity. As another example, network entities of a managed network could report raw performance metrics to an intermediary device, such as the proxy server 312, which could process the raw data according to one or more thresholds. The intermediary device could then report alerts back to a remote management server. In this example, the remote management server could communicate with the intermediary device to set up thresholds, targets, and ranges, and to receive alerts and other performance monitoring data. As still another example, raw performance metrics and monitoring data could be reported back to a remote management server, which could then apply the processing to detect conditions for issuing alerts. In any or all of these examples, analysis of performance data for determination of alerts could be carried out in real-time or near-real time as performance is actively monitored and metrics are collected. Additionally or alternatively, analysis could be carried out after the fact on historical performance data. Combinations of these examples could be implemented if a remote network management system, as well as other techniques.

VI. EXAMPLE OPERATIONS

Figure 9:
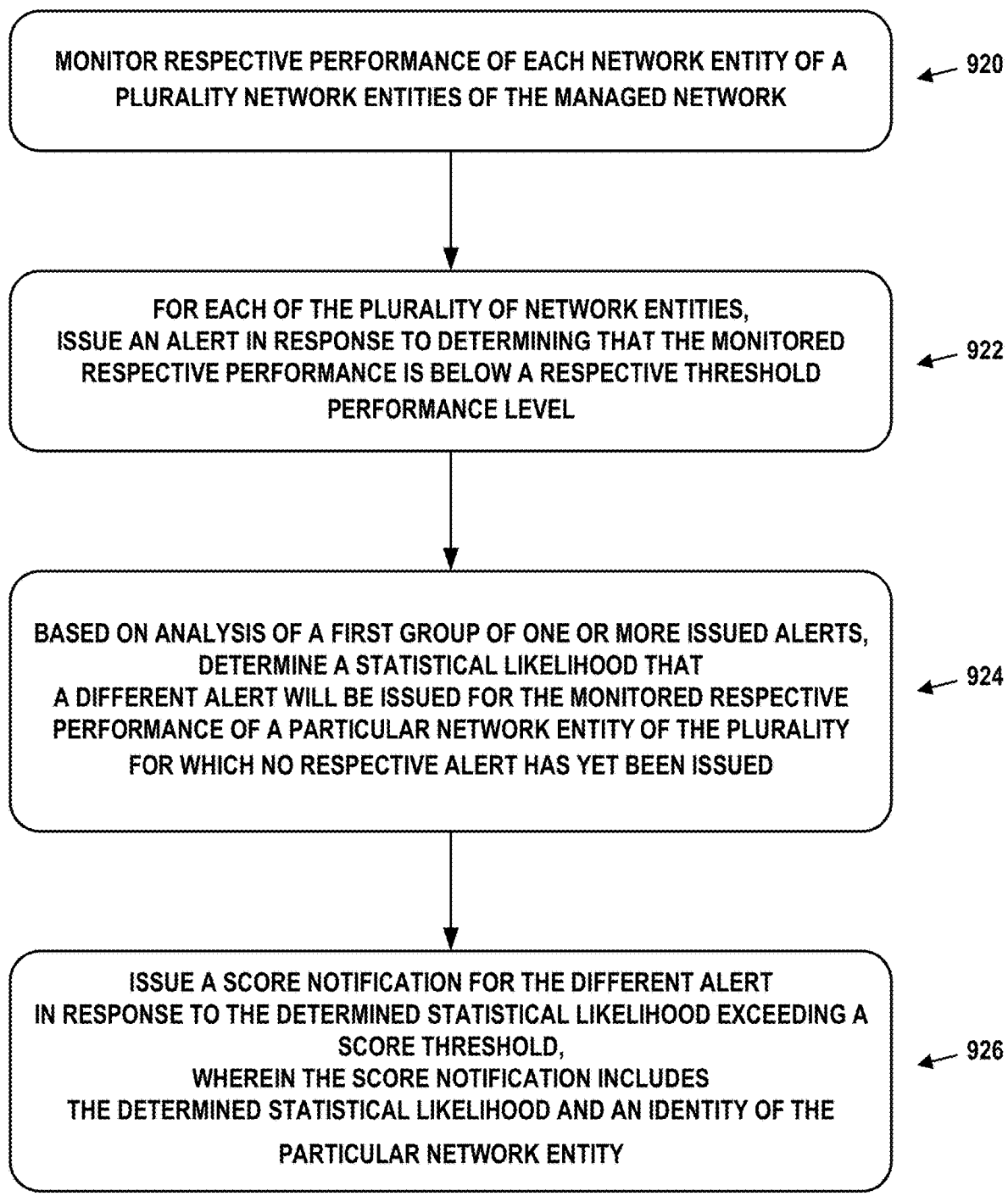
FIG. 9 is a flow chart of an example method of performance monitoring, in accordance with example embodiments.

FIG. 9 is a flow chart of an example method of performance monitoring, in accordance with example embodiments. The method illustrated by FIG. 9 may be carried out by a computing system disposed within a remote network management platform and configured to support a managed network that includes manageable network entities. Non-limiting examples of a computing system include the computing system 700 in the customer instance management server 600 illustrated in FIG. 7, and more generally in computing device 100, and/or a cluster of computing devices, such as server cluster 200. However, the method can be carried out by other types of devices or device subsystems. For example, the process could be carried out by a portable computer, such as a laptop or a tablet device.

The example method may be implemented as machine language or other forms of computer-readable programmatic instructions stored in memory and accessible to one or more processors of the computing device or computing system that, when executed by one or more processors of the computing device or computing system, cause the computing device or computing system to carry out the various steps, functions, and/or operations described herein. The machine language or other forms of programmatic instructions may further be stored on tangible, non-transitory computer-readable medium for delivery to and loading in one or more computing systems for subsequent execution.

The embodiments of FIG. 9 may be simplified by the removal of any one or more of the features shown therein. Further, these embodiments may be combined with features, aspects, and/or implementations of any of the previous figures or otherwise described herein.

At block 920, the computing system monitors respective performance of each network entity of a plurality of network entities of the managed network. In accordance with example embodiments, each network entity may be a service of the managed network and/or a computing device of the managed network. Each service of the managed network may execute or be configured to execute on at least one computing device of the managed network.

At block 922, for each of the plurality of network entities, the computing system issues an alert in response to determining that the monitored respective performance is below a respective threshold performance level.

At block 924, the computing system, based on analysis of a first group of one or more issued alerts, determines a statistical likelihood that a different alert will be issued for the monitored respective performance of a particular network entity of the plurality for which no respective alert has yet been issued.

Finally, at block 926, the computing system issues a score notification for the different alert in response to the determined statistical likelihood exceeding a score threshold. In accordance with example embodiments, the score notification may include the determined statistical likelihood and an identity of the particular network entity.

In accordance with example embodiments, the example method could also be applied to one or more additional groups of issued alerts. For example, based on analysis of a second group of one or more issued alerts, the computing system could determine another statistical likelihood that another different alert will be issued for the monitored respective performance of another particular network entity of the plurality for which no respective alert has yet been issued. The computing system could then issue another score notification for the other different alert in response to the determined other statistical likelihood exceeding another score threshold. As with the score notification of block 926, this other score notification could include the determined other statistical likelihood and an identity of the other particular network entity.

In accordance with example embodiments, the remote management platform could be communicatively connected to the plurality of network entities via an intermediary network device in the managed network, such as the proxy servers 312. Thus, monitoring the respective performance of each network entity of the plurality of network entities could entail transmitting one or more messages from the computing system to the intermediary network device requesting performance metrics of one or more network entities of the plurality, and thereafter receiving data transmitted from the intermediary network device indicative of the requested performance metrics. In this way, the remote management platform or its computing system could effectively control or influence the intermediary device, causing it to acquire or obtain monitoring data from the network entities.

For example, referring to FIGS. 3 and 5A, the management platform send a message to router 306 by way of a proxy server 312, causing the router 306 to carry out or more SNMP management functions in order to collect performance metrics from one or more configuration items (e.g., manageable network entities). The metrics, or possibly some derive quantity or indicator thereof, could be returned to management platform. Other management functions/operations and/or devices could be used instead or as well.

Also in accordance with example embodiments, determining that the monitored respective performance is below the respective threshold performance level could entail determining that a metric indicative of performance either below a target threshold, or outside of a target operating range. That is, the meaning of "below the respective performance level" can be viewed as encompassing comparison to a single threshold level or to a defined range.

In accordance with example embodiments, determining the statistical likelihood based on analysis of the first group of one or more issued alerts could entail determining a respective conditional probability for each of the respective issued alerts. Specifically, each conditional probability could be a probability that the monitored respective performance of the particular network entity will be below a particular threshold performance level given an occurrence of issuance of the respective issued alert.

In further accordance with example embodiments, determining the respective conditional probability could entail compiling a historical record of alerts issued for both (i) the monitored respective performance of the network entities of the plurality associated with the first group of the one or more issued alerts, and (ii) the monitored respective performance of the particular network entity. Then, a joint probability distribution of the historical record could be computed, and the respective conditional probability derived from the computed joint probability distribution. In an example embodiment, computing the joint probability distribution of the historical record could be accomplished by computing an analytic approximation of the joint probability distribution as a Chow-Liu tree.

In still further accordance with example embodiments, the example method could further include actions or operations taken prior to determining the statistical likelihood. Specifically, the first group of the one or more issued alerts could be identified prior to determining the statistical likelihood. The different alert could be identified as a potential alert that is associated with the first group, also prior to determining the statistical likelihood. In an example embodiment, identifying the different alert as a potential alert associated with the first group could correspond to determining a causal relation between the first group and the potential alert.

In further accordance with example embodiments, identifying and associating alerts could be an interactive operation performed, for example, by a user monitoring the network by way of input/output facilities and functions of the computing system. Thus, identifying the first group of issued alerts from among a plurality of issued alerts could entail displaying the plurality of issued alerts on the interactive display device, and then using an interactive cursor of the interactive display device to select the first group of issued alerts from among the displayed plurality of issued alerts.

In accordance with example embodiments, issuing a score notification for the different alert could entail computing a prediction score as a statistical confidence level that an alert will be issued for the monitored respective performance of the particular network entity. The prediction score could then be reported, for example in the form of a display on a display device.

In further accordance with example embodiments the example method could also include setting the respective threshold performance level of each of the plurality of network entities, as well as setting the score threshold. In this way, a user could set target levels of performance metrics at which active alerts would be issued, and at which predictions of future alerts would be issued.

A. Other Variations and Embodiments

The example computing devices, platforms, network entities, and the like described above represent individually and/or collectively device means for carrying out the various operations, functions, and methods described herein. Similarly, the example methods described in connection with FIGS. 5B and 9 represent operational means, when made operational on one or more of the device means, for implementing the various example embodiments described herein.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system disposed within a remote network management platform and configured to support a managed network, the computing system comprising:
    a processor; and
    memory storing program instructions that, upon execution by the processor, cause the processor to perform operations comprising:
        monitoring respective performance of a plurality of network entities of the managed network, wherein each network entity of the plurality of network entities is associated with a service of the managed network or a computing device of the managed network;
        issuing an event notification in response to determining that at least one of the monitored respective performance is below a threshold performance level for a first network entity of the plurality of network entities;
        predicting a statistical likelihood that an additional event notification will be issued based on analysis of a group of event notifications that includes the issued event notification; and
        reporting a prediction score to indicate the statistical likelihood for the additional event notification in response to the statistical likelihood exceeding a score threshold.

2. The computing system of claim 1, wherein the reporting of the prediction score visually associates the statistical likelihood with a visualization corresponding to the monitored respective performance.

3. The computing system of claim 1, wherein the remote network management platform is communicatively coupled to the plurality of network entities via an intermediary network device in the managed network, and wherein monitoring the respective performance of each network entity of the plurality of network entities comprises:
    transmitting one or more messages from the computing system to the intermediary network device requesting performance metrics of one or more network entities of the plurality; and
    receiving data transmitted from the intermediary network device indicative of the performance metrics.

4. The computing system of claim 1, wherein determining that the monitored respective performance is below the threshold performance level comprises determining that a performance metric corresponding to the monitored respective performance is less than a target threshold or outside of a target operating range.

5. The computing system of claim 1, wherein predicting the statistical likelihood that the additional event notification will be issued comprises determining, for each respective issued event notification of the group of event notifications, a respective conditional probability that the monitored respective performance will be below a particular threshold performance level within a period of time following the event notification.

6. The computing system of claim 5, wherein determining the respective conditional probability that the monitored respective performance will be below the particular threshold performance level comprises:
    generating a historical record of event notifications issued for the monitored respective performance of the plurality of network entities;
    determining a joint probability distribution of the historical record; and
    determining the respective conditional probability based at least in part on the joint probability distribution.

7. The computing system of claim 6, wherein determining the joint probability distribution of the historical record comprises determining an analytic approximation of the joint probability distribution as a Chow-Liu tree.

8. The computing system of claim 1, wherein the operations include:
    identifying the group of event notifications from among a plurality of issued event notifications; and
    identifying the additional event notification as a potential event notification associated with the group of event notifications.

9. The computing system of claim 8, wherein identifying the additional event notification as a potential event notification associated with the group of event notifications comprises determining a causal association between the group of event notifications and the additional event notification.

10. The computing system of claim 8, wherein the computing system comprises an interactive display device, and wherein identifying the group of event notifications from among a plurality of issued event notifications comprises:
displaying the plurality of issued event notifications on the interactive display device; and
receiving a selection that indicates the group of event notifications from among the displayed plurality of issued event notifications.

11. The computing system of claim 1, wherein reporting the prediction score for the additional event notification comprises using the score threshold to compare the prediction score to a statistical confidence level that the additional event notification will be issued.

12. The computing system of claim 1, wherein the operations include:
setting the respective threshold performance level for each of the plurality of network entities; and
setting the score threshold.

13. A method, comprising:
determining that an operation of a network entity corresponds to a performance level below a threshold performance level;
in response to determining that the performance level is below the threshold performance level, issuing a first event notification;
predicting a likelihood that a second event notification is going to be issued based at least in part on an analysis of a group of event notifications comprising the first event notification and other event notifications; and
in response to the predicted likelihood being greater than a score threshold, updating a display device to report a prediction score configured to indicate the predicted likelihood for the issuing of the second event notification.

14. The method of claim 13, comprising monitoring each respective operation of each network entity of a plurality of network entities, wherein each network entity of the plurality of network entities is associated with a service of a managed network or a computing device of the managed network.

15. The method of claim 14, wherein the threshold performance level is defined on a per-network entity basis.

16. The method of claim 13, comprising:
requesting performance metrics of the network entity from an intermediary network device, wherein the performance metrics correspond to one or more performance levels associated with the operation of the network entity; and
receiving data from the intermediary network device indicative of the performance metrics.

17. The method of claim 13, wherein predicting the likelihood comprises:
generating a historical record of event notifications issued for a plurality of network entities comprising the network entity;
determining a joint probability distribution of the historical record; and
for each issued event notification of the group of event notifications, determining a respective conditional probability based at least in part the joint probability distribution, wherein each conditional probability is configured to indicate that a monitored respective performance of one of the plurality of network entities will be below the threshold performance level.

18. A non-transitory, computer-readable medium having instructions stored thereon that, when executed by one or more processors of a computing system associated with a managed network, cause the computing system to carry out operations including:
monitoring respective performance of a plurality of network entities of the managed network, wherein each network entity of the plurality of network entities is associated with a service of the managed network or a computing device of the managed network;
issuing an event notification in response to determining that at least one of the monitored respective performance is below a threshold performance level for a first network entity of the plurality of network entities;
predicting a statistical likelihood that an additional event notification will be issued based on analysis of a group of event notifications that includes the issued event notification; and
reporting a prediction score to indicate the statistical likelihood for the additional event notification in response to the statistical likelihood exceeding a score threshold.

19. The non-transitory, computer-readable medium of claim 18, wherein predicting the statistical likelihood comprises:
generating a record of event notifications issued for the monitored respective performance of the plurality of network entities, wherein the record comprises one or more active event notifications, one or more historical event notifications, or a combination of both;
determining a joint probability distribution of the record; and
determining the statistical likelihood based at least in part on the joint probability distribution.

20. The non-transitory, computer-readable medium of claim 18, wherein reporting the prediction score comprises changing an indication presented via a display device in response to a value of the statistical likelihood.

* * * * *

UNITED STATES PATENT AND TRADEMARK OFFICE
CERTIFICATE OF CORRECTION

PATENT NO. : 10,826,757 B2  
APPLICATION NO. : 16/513079  
DATED : November 3, 2020  
INVENTOR(S) : Kanwaldeep Dang et al.

Page 1 of 1

It is certified that error appears in the above-identified patent and that said Letters Patent is hereby corrected as shown below:

In the Claims

Bridging Column 27, Line 67, and Column 28, Line 1, Claim 1 - please replace "performance" with --performances--.

Column 30, Line 10, Claim 17 - please insert --on-- between "part" and "the".

Column 30, bridging Lines 27 and 28, Claim 18 - please replace the word "performance" with --performances--.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*